United States Patent
Xue et al.

(10) Patent No.: US 10,200,982 B2
(45) Date of Patent: Feb. 5, 2019

(54) STRUCTURED SUPER-POSITIONING CODING TO ENHANCE CONTROL CHANNEL CAPACITY

(71) Applicant: Intel Corporation, Santa Clara, CA (US)

(72) Inventors: Feng Xue, Redwood City, CA (US); Jong-Kae Fwu, Sunnyvale, CA (US); Hwan-Joon Kwon, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/498,427

(22) Filed: Sep. 26, 2014

(65) Prior Publication Data

US 2016/0095090 A1 Mar. 31, 2016

(51) Int. Cl.
*H04W 72/04* (2009.01)
*H04W 48/12* (2009.01)
(Continued)

(52) U.S. Cl.
CPC ......... *H04W 72/042* (2013.01); *H04J 11/004* (2013.01); *H04J 11/005* (2013.01);
(Continued)

(58) Field of Classification Search
None
See application file for complete search history.

(56) References Cited

U.S. PATENT DOCUMENTS

| 2003/0053520 A1* | 3/2003 | Nelson | H04B 1/707 375/142 |
| 2005/0068918 A1* | 3/2005 | Mantravadi | H04B 7/0669 370/328 |

(Continued)

FOREIGN PATENT DOCUMENTS

| JP | 2010200249 A | 9/2010 |
| WO | 2009058905 A2 | 5/2009 |

(Continued)

OTHER PUBLICATIONS

PCT/US2015/047476, International Search Report and Written Opinion, dated Dec. 11, 2015, 13 pages.

*Primary Examiner* — Ayaz R Sheikh
*Assistant Examiner* — Mariela Vidal Carpio
(74) *Attorney, Agent, or Firm* — Stoel Rives LLP (57) ABSTRACT

Systems and methods to encode and/or decode structured super-position coding to enhance control channel capacity are disclosed herein. User equipment (UE) may be configured to communicatively couple to an Evolved Universal Terrestrial Radio Access Network (E-UTRAN) Node B (eNB). A first UE and a second UE may be coupled to the eNB. Basic PDCCH may be sent to the second UE, and extra PDCCH may be sent to the first UE on the same time-frequency resource. The second UE may be able to decode the basic PDCCH as it normally does. The first UE may be able to decode the basic PDCCH for the second UE, cancel the basic PDCCH from the signal, and decode the extra PDCCH. The extra PDCCH may be restricted to certain positions relative to the basic PDCCH to simplify searching by the first UE.

17 Claims, 7 Drawing Sheets

(51) Int. Cl.
  *H04J 11/00*   (2006.01)
  *H04B 1/7107*  (2011.01)
  *H04W 84/04*   (2009.01)

(52) U.S. Cl.
  CPC ........ *H04J 11/0036* (2013.01); *H04B 1/7107* (2013.01); *H04W 48/12* (2013.01); *H04W 84/042* (2013.01)

(56) References Cited

U.S. PATENT DOCUMENTS

| | | | | |
|---|---|---|---|---|
| 2008/0287155 | A1* | 11/2008 | Xu | H04L 5/0007 455/522 |
| 2009/0323777 | A1 | 12/2009 | Wang et al. | |
| 2010/0061345 | A1* | 3/2010 | Wengerter | H04L 1/0017 370/335 |
| 2012/0201162 | A1* | 8/2012 | Kim | H04B 17/345 370/252 |
| 2013/0196700 | A1 | 8/2013 | Tiirola et al. | |
| 2013/0322276 | A1 | 12/2013 | Pelletier et al. | |
| 2014/0192730 | A1* | 7/2014 | Seo | H04L 5/0053 370/329 |
| 2014/0192783 | A1 | 7/2014 | Zhao et al. | |
| 2014/0269246 | A1* | 9/2014 | Yoo | H04J 3/10 370/201 |
| 2014/0293942 | A1* | 10/2014 | Kang | H04L 5/0053 370/329 |
| 2015/0117353 | A1* | 4/2015 | Takeda | H04W 72/042 370/329 |
| 2015/0131573 | A1* | 5/2015 | Yoo | H04B 15/00 370/329 |
| 2015/0139293 | A1* | 5/2015 | Stanwood | H04L 27/01 375/230 |

FOREIGN PATENT DOCUMENTS

| | | | | |
|---|---|---|---|---|
| WO | 2013055143 A2 | 4/2013 | | |
| WO | WO2013/055143 | * | 4/2013 | ............. H04L 27/26 |
| WO | WO2013/168794 | * | 11/2013 | ............. H04W 72/04 |

* cited by examiner

STRUCTURED SUPER-POSITIONING CODING TO ENHANCE CONTROL CHANNEL CAPACITY

TECHNICAL FIELD

The present disclosure relates to systems, methods, and devices for utilizing structured super-position coding to enhance capacity of a control channel.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet.

LTE networks include radio access technology and core radio network architecture that provide high data rate, low latency, packet optimization, and improved system capacity and coverage. In LTE networks, an eNB may communicate control information to one or more UEs coupled to the eNB. The eNB may transmit control information, such a Physical Downlink Control Channel (PDCCH) to the UE. The PDCCH may manage lower layer coupling between the eNB and the UE (e.g., the physical layer). The information bandwidth of the PDCCH may be limited to a predetermined threshold. For example, the PDCCH may be restricted to the first 2-4 symbols in a subframe. As more advanced operation modes and configurations are added to LTE (e.g., coordinated multipoint (CoMP), carrier aggregation (CA), etc.), the control channel requires greater capacity to handle the additional signaling required. There may be more demand on control channel resources if more features are added in the future. Accordingly, there is a need for extra capacity for the PDCCH.

An eNB may transmit extra PDCCH on top of basic or weak PDCCH to increase capacity of the PDCCH (e.g., using super-position coding). The extra PDCCH may be transmitted using the same frequency-time resource as the basic PDCCH (e.g., on the same subframe and/or at the same frequency). In an embodiment, the extra PDCCH may be intended for a first UE near the eNB and the basic PDCCH may be intended for a second UE farther away from the eNB. Alternatively, the basic and extra PDCCH may both be intended for a same UE. The second UE may be able to decode the basic PDCCH normally. Accordingly, the basic PDCCH may be sent to legacy UEs that are unable to decode the extra PDCCH, and no modification to legacy UEs may be required for them to continue receiving basic PDCCH. The power of the transmission of the extra PDCCH may be selected to have only a minor effect on the second UE's ability to decode the basic PDCCH.

The first UE may receive a message from the eNB indicating that the first UE should search for extra PDCCH. The message may be sent via higher layer signaling (e.g., a Radio Resource Control (RRC) message). Once the first UE has enabled searching for extra PDCCH and received a signal transmitted by the eNB, the first UE may attempt to decode basic PDCCH intended for the first UE as if searching for extra PDCCH was not enabled. The first UE may blind decode all possible legacy PDCCH locations (e.g., a maximum of 44 decodes for release 8/9 of LTE). If the first UE does not find any basic PDCCH intended for it, it may attempt to decode extra PDCCH to determine if any extra PDCCH is intended for it. The first UE may demodulate and/or decode basic PDCCH intended for the second UE. The first UE may use interference cancellation (IC) to cancel the basic PDCCH. The IC may be symbol-level and/or codeword-level IC. Then, the first UE may decode the extra PDCCH. The first UE may perform blind decoding to locate and decode the extra PDCCH. In an embodiment, the basic and extra PDCCH may both be intended for the first UE, so the first UE may decode the basic PDCCH and may always search for extra PDCCH. Alternatively, if the UE has decoded basic PDCCH intended for it, the first UE may determine whether predetermined criteria are satisfied before attempting to decode extra PDCCH (e.g., whether the eNB indicated the first UE should do so, whether the basic PDCCH was complete, etc.).

To simplify blind decoding, the extra PDCCH may be restricted to a predetermined set of locations and/or sizes (e.g., restricted to aggregation levels meeting predetermined criteria. For example, the extra PDCCH may be required to be smaller than or equal to the length of the basic PDCCH. The extra PDCCH may be required to have a starting position in a resource map at a same location as the basic PDCCH and/or at a midpoint of the basic PDCCH. Alternatively, or in addition, the basic PDCCH may be required to begin at the starting position of the basic PDCCH or locations differing from the starting position of the basic PDCCH by multiples of $\frac{1}{2}^n$ times the length of the basic PDCCH. In some embodiments, n may be a predetermined value selected from zero, one, two, or three and/or may be indicated to the UE by an eNB. The position of the extra PDCCH may have be predetermined and may be communicated through higher layer signaling, and/or blind decoding may be used to search all possible locations the extra PDCCH may begin. The aggregation level of the extra PDCCH and/or the basic PDCCH may be restricted to certain values. For example, the aggregation level of the extra PDCCH may be required to be less than or equal to the aggregation level of the basic PDCCH. The aggregation level of the extra PDCCH may be higher than it would have been had the extra PDCCH been transmitted as basic PDCCH so that a higher coding rate can be used for the contents of the extra PDCCH. For example, an extra PDCCH that would have an aggregation level of one or two if it was a basic PDCCH may instead have an aggregation level of four.

The first UE may be able to support a higher level of modulation than the second UE. For example, the first UE may be able to support 16 Quadrature Amplitude Modulation (QAM) or 64 QAM. The basic PDCCH may be transmitted using Quadrature Phase-Shift Keying (QPSK), and the extra PDCCH may be transmitted using QPSK such that on a constellation plot where the basic PDCCH occupies all four quadrants, the extra PDCCH will occupy only a single quadrant. Thus, the combined modulation may resemble 16 QAM from the perspective of the first UE. To transmit the basic and extra PDCCH, the eNB may divide its transmit power into two parts (e.g., part p1 and part p2) and transmit the basic PDCCH using one part and the extra PDCCH with the other. The eNB may select the power of each part of the transmit power so that a power ratio between the two parts equals a selected value and/or meets predetermined criteria. The power of each part may be selected such that the second UE is able to decode the basic PDCCH by treating the extra PDCCH as noise and the first UE is able to decode the extra PDCCH by first decoding and canceling the basic PDCCH at the modulation level (e.g., using symbol-level IC). In some embodiments, the power ratio may be predefined, predetermined, and/or determined semi-statically via higher layer signaling (e.g., RRC messaging), which may simplify decoding by the UE.

A UE may be able to receive extra PDCCH from an eNB other than the eNB transmitting the basic PDCCH. For example, the basic and extra PDCCH may be sent rather than almost blank subrames (ABS) in a heterogeneous network. In an embodiment, a first eNB may be a high power eNB (e.g., a macro eNB), and a second eNB may be a lower power eNB (e.g., a micro eNB, a pico eNB, a femto eNB, etc.). In some situations, the received power from the high power eNB may be many dB higher than the received power from the lower power eNB even when the UE is closer to the lower power eNB that it is to the higher power eNB. The first eNB may transmit the extra PDCCH and the second eNB may transmit the basic PDCCH or vice versa. The basic PDCCH may be intended for a different eNB than the extra PDCCH, or the basic and extra PDCCH may be intended for a same eNB. The UE may decode the basic and extra PDCCH as before. First, the UE may decode the basic PDCCH, then it may cancel the basic PDCCH, and finally it may decode the extra PDCCH. There may be several benefits from transmitting PDCCH from two eNBs. The spectrum may be used more efficiently than if ABS are used; an extra control channel may be provided for the UE; and when CoMP is used and the macro UE provides more control and coordination, the extra control channel may facilitate the cooperation naturally.

Multiple extra PDCCHs (e.g., for multiple additional UEs) may be included in the same frequency-time resource as the basic PDCCH. For example, if the aggregation level of a first extra PDCCH is half of the aggregation level of the basic PDCCH, a second extra PDCCH that is also half of the aggregation level of the basic PDCCH may be included as well. One of the extra PDCCHs may have a starting position coinciding with the starting position of the basic PDCCH, and the other extra PDCCH may have a starting position coinciding with a midpoint of the basic PDCCH. If the aggregation level of the extra PDCCH is even smaller relative to the basic PDCCH (e.g., ¼ or ⅛ the PDCCH), additional extra PDCCHs (e.g., for other UEs) may be transmitted and/or additional starting positions may be used.

Figure 1:
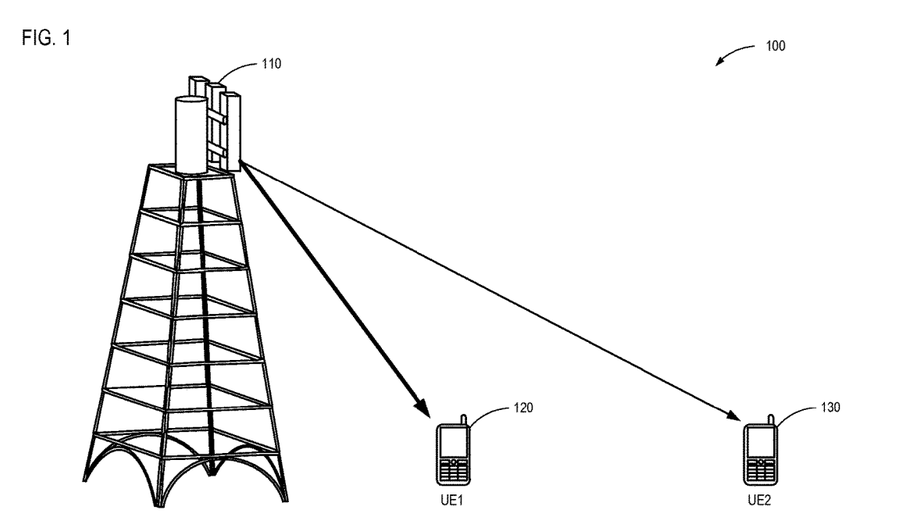
FIG. 1 is a schematic diagram of a system including an eNB communicatively coupled with a plurality of UEs.

FIG. 1 is a schematic diagram of a system 100 including an eNB 110 communicatively coupled with a plurality of UEs 120, 130. A first UE 120 may be closer to the eNB 110 and may receive a strong signal. A second UE 130 may be farther away from the eNB 110 and may receive a weaker signal. The eNB 110 may leverage the difference in signal strengths to provide basic PDCCH to the second UE 130 and extra PDCCH to the first UE 120. Alternatively, the first and second UEs 120, 130 may both be near the eNB 110 and receive the basic PDCCH and extra PDCCH. The basic and extra PDCCH may be transmitted on a same frequency-time resource. The extra PDCCH may appear to be noise to the second UE 130, but the second UE 130 may nonetheless be able to decode the basic PDCCH due to a difference in transmit power between the basic PDCCH and the extra PDCCH. The first UE 120 may be able to decode the basic PDCCH and the extra PDCCH. The first UE 120 may decode the basic PDCCH. It may use the decoded information to cancel the basic PDCCH from the signal. The first UE 120 may decode the extra PDCCH from the signal with the basic PDCCH cancelled. Accordingly, the eNB 110 may be able to use the bandwidth more efficiently than if it had just sent the basic PDCCH to the second UE 130.

Figure 2:
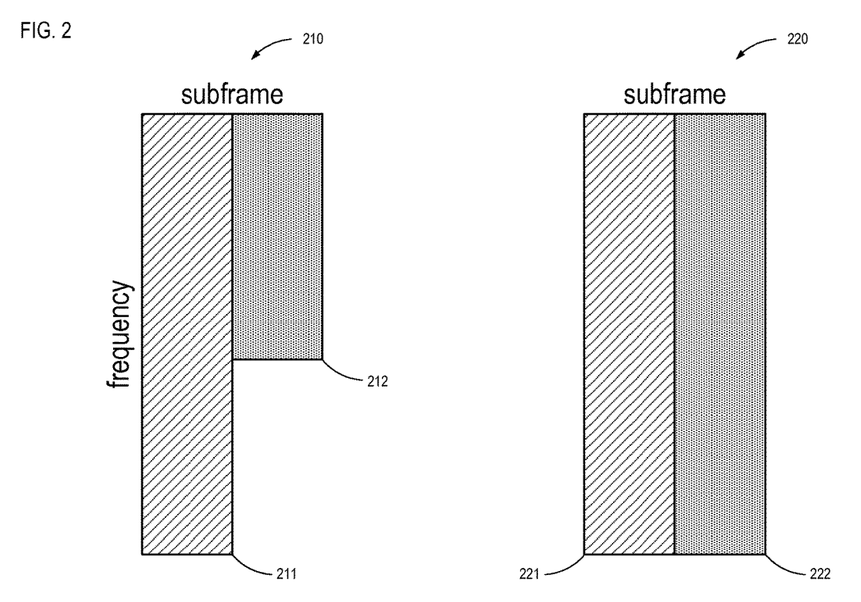
FIG. 2 is a schematic diagram of a plurality of configurations of the basic PDCCH and extra PDCCH within a same frequency-time resource.

FIG. 2 is a schematic diagram of a plurality of configurations 210, 220 of the basic PDCCH 211, 221 and extra PDCCH 212, 222 within a same frequency-time resource. The basic PDCCHs 211, 221 may each include one or more control channel elements (CCE). The number of CCEs used by each basic PDCCH 211, 221 may be an aggregation level of that PDCCH. In an embodiment, the basic PDCCH may have an aggregation level of one, two, four, or eight and may include a corresponding number of CCEs. In the illustrated embodiment, each of the extra PDCCHs 212, 222 may be restricted to a size (e.g., have an aggregation level) equal to or smaller than the size of the corresponding basic PDCCHs 211, 221 (e.g., ½, ¼, ⅛, etc.). In some embodiments, the extra PDCCHs 212, 222 may be restricted to being equal to, no smaller than half of, or no smaller than a quarter of the size of the basic PDCCH 211, 221.

The positions of the extra PDCCHs 212, 222 relative to the basic PDCCHs 211, 221 may also be restricted to predetermined positions. For example, each CCE may be identified by a logical index, and the basic PDCCHs 211, 221 may start at a particular index (e.g., a zero position or starting position of the basic PDCCH). The extra PDCCHs 212, 222 may be restricted to a starting position of the basic PDCCH 2221 (e.g., if their sizes are equal), as seen in the second configuration 220, or may be restricted to a starting position or a midpoint of the basic PDCCH 211 (e.g., if the extra PDCCH 212 is half as large as the basic PDCCH 211 or smaller), as seen in the first configuration 210. The midpoint may be a CCE with a logical index that differs from the starting position by half the size of the PDCCH. In other embodiments or configurations, the starting position of the extra PDCCHs 212, 222 may differ from the starting positions of the corresponding basic PDCCHs 211, 221 by an integer multiple of ¼ or ⅛ of the size of the corresponding basic PDCCHs 211, 221. Because the positions of the extra PDCCHs 212, 222 may be limited to certain locations, less searching may be required to locate the extra PDCCHs 212, 222, which may conserve power.

Figure 3:
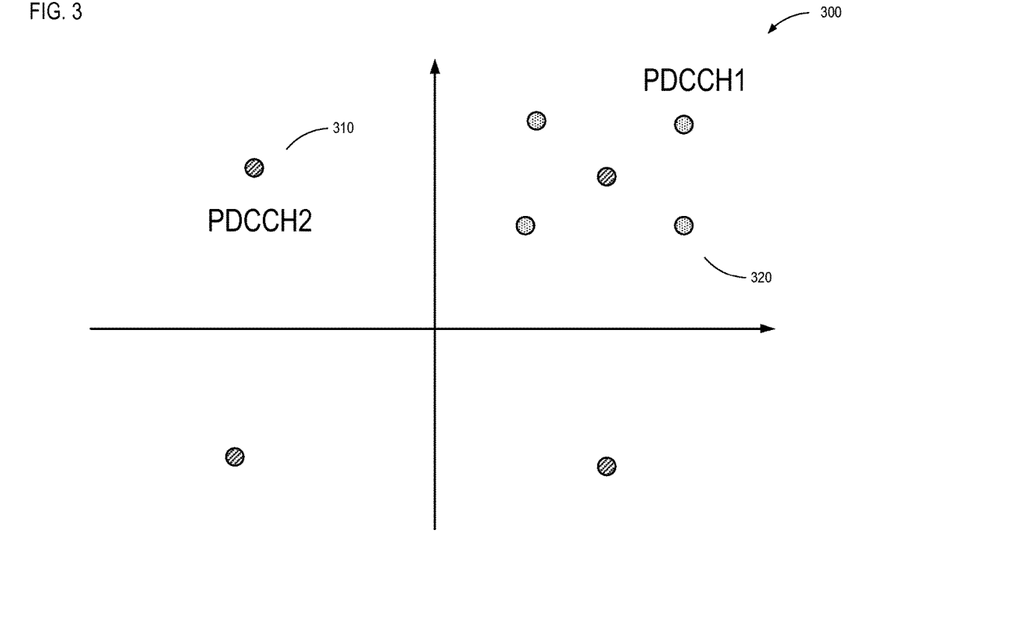
FIG. 3 is a constellation plot showing the modulation of the basic PDCCH and of the extra PDCCH.

FIG. 3 is a constellation plot 300 showing the modulation of the basic PDCCH 310 and of the extra PDCCH 320. The basic and extra PDCCH may each be modulated using QPSK, but the extra PDCCH may be able to support a higher modulation level, such as 16 QAM. An eNB may divide its transmit power into two parts. A first part may be used to transmit the basic PDCCH 310, and the second part may be used to transmit the extra PDCCH 320. The power level and modulation may be configured to produce a constellation similar to the one illustrated. In the illustrated constellation plot, the basic PDCCH includes four symbols that each occupy a unique quadrant of the constellation plot (e.g., all the quadrants are occupied), and the extra PDCCH only occupies a first quadrant of the constellation plot. In other embodiments, the constellation may produce symmetrical plots where the extra PDCCH occupies another quadrant and/or occupies multiple quadrants. The locations of the symbols of the extra PDCCH 320 may be similar to the location of symbols produced by a transmission of 16 QAM.

The power ratio between the power of the first and the power of the second part may be selected to meet predetermined criteria. The predetermined criteria may include that a second UE be able to decode the basic PDCCH 310 by treating the extra PDCCH 320 as noise and that a second UE be able to decode the extra PDCCH 320 by first cancelling the basic PDCCH 310 at the modulation level (e.g., at a symbol level). In some embodiments, the power ratio may be a predefined and/or predetermined value. Alternatively, or in addition, the power ratio may be determined semi-statically and/or dynamically through higher layer signaling (e.g., RRC messaging).

Figure 4:
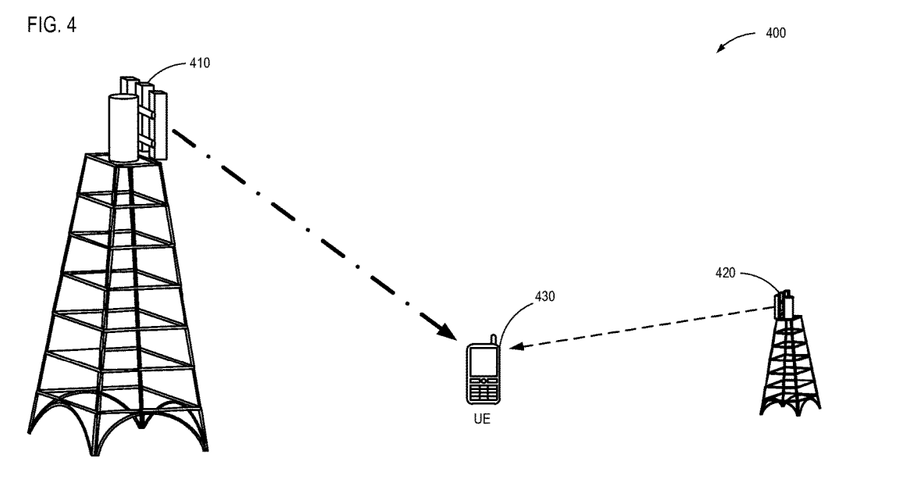
FIG. 4 is a schematic diagram of a UE, which may be configured to receive PDCCH from a macro eNB and a small eNB.

FIG. 4 is a schematic diagram of a UE 430, which may be configured to receive PDCCH from a macro eNB 410 and a small eNB 420 (e.g., a micro, pico, or femto cell). The UE 430 may be able to receive intra-cell PDCCH (e.g., to increase capacity and/or transmit PDCCH to multiple UEs) and inter-cell PDCCH (e.g., to increase capacity and/or allow multiple eNBs to provide PDCCH to a single UE). Inter-cell PDCCH may be used in situations where ABS are used. Differences in signal strength of the macro and small cells may be taken advantage of to provide extra PDCCH and basic PDCCH to the UE 430. As a result of range extension of small cells, the UE 430 may be receiving a stronger signal from the macro eNB 410 than the small eNB 420 despite being coupled to the small eNB 420. Alternatively, a stronger signal may be received from the small eNB 420, and/or the signals may be approximately equal in strength.

Either the macro eNB 410 or the small eNB 420 may transmit basic PDCCH to the UE 430 using a time-frequency resource, and the other of the macro eNB 410 and the small eNB 420 may transmit extra PDCCH to the UE 430 using the same time-frequency resource. The UE 430 may decode the basic and extra PDCCH like in the single cell case. The UE 430 may initially decode the basic PDCCH. The UE 430 may use the decoded basic PDCCH to cancel the basic PDCCH from the received signal. The UE 430 may decode the extra PDCCH from the signal with the basic PDCCH canceled from it. Higher layer signaling (e.g., RRC messaging) may be used to indicate to the UE that it should expect PDCCH from multiple eNBs. In some embodiments, the basic PDCCH and extra PDCCH may be intended for different UEs rather than the same UE 430. The extra PDCCH may increase the control channel capacity and/or provide extra control channel information to the UE. Alternatively, or in addition, when CoMP is being used, the macro eNB 410 may provide additional control and coordination. The extra PDCCH may provide the resources necessary to provide the additional control and coordination information to the UE 430. Moreover, the search space for the UE 430 to locate the PDCCH from the macro eNB 410 and the small eNB 420 may be reduced.

Figure 5:
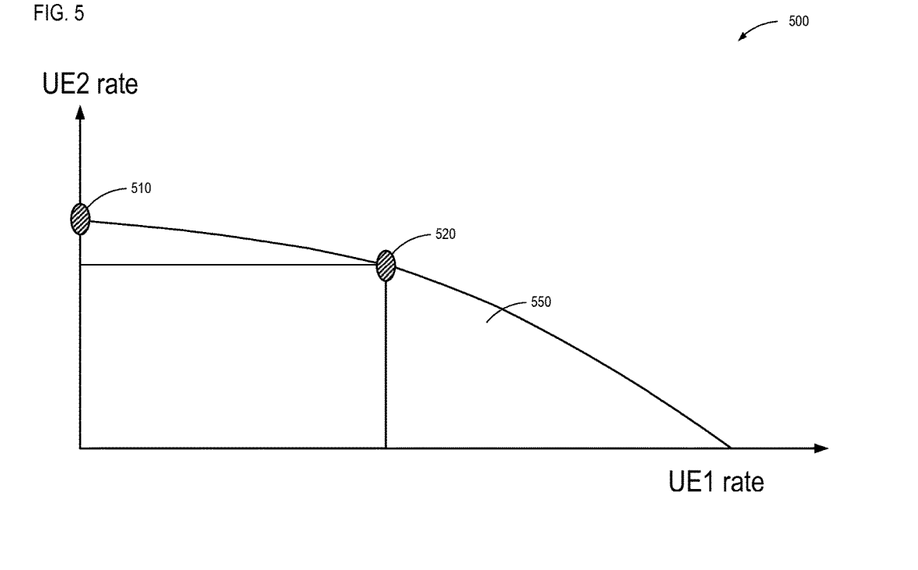
FIG. 5 is a plot comparing a tradeoff between a control channel rate for a second UE receiving PDCCH and a control channel rate for a first UE receiving PDCCH.

FIG. 5 is a plot 500 comparing a tradeoff between a control channel rate for a second UE receiving PDCCH and a control channel rate for a first UE receiving PDCCH. The plot 500 may indicate the rates for a single input single output (SISO) Gaussian channel. A y-axis may indicate a control channel rate for the second UE, and an x-axis may represent a control channel rate for the first UE. A broadcast capacity region 550 may include all possible combinations of rates that are achievable when transmitting information from an eNB to the first and second UEs. The broadcast capacity region may be bounded by a curve corresponding to the maximum possible rates achievable for the pair of UEs. When only basic PDCCH is included without any extra PDCCH, the first UE may have a rate of zero, and the second UE may have a rate corresponding to its own channel capacity. A first point 510 may represent the capacities of the first and second UEs when only basic PDCCH is used.

At the first point 510, the slope of the curve bounding the broadcast region may be relatively flat. The rate for the first UE may be increased with only a relatively small decline in the rate of the second UE occurring. Extra PDCCH intended for the first UE may be added with a low transmission power so that the reception of the basic PDCCH by the second UE is only slightly degraded. Accordingly, super-position coding may be used to transmit control channel information to both the first and second UEs while achieving the full capacity rates on the curve. A second point 520 may correspond to the rates of the first and second UEs when extra PDCCH intended for the first UE is included in a transmission of basic PDCCH intended for the second UE. At the second point, a substantially higher rate has been achieved for the first UE while still providing information to the second UE at reasonable rate. Thus, basic PDCCH may sent to the second UE when needed, but the spectrum may be used more efficiently by including the extra PDCCH rather than only sending the basic PDCCH to the second UE.

Figure 6:
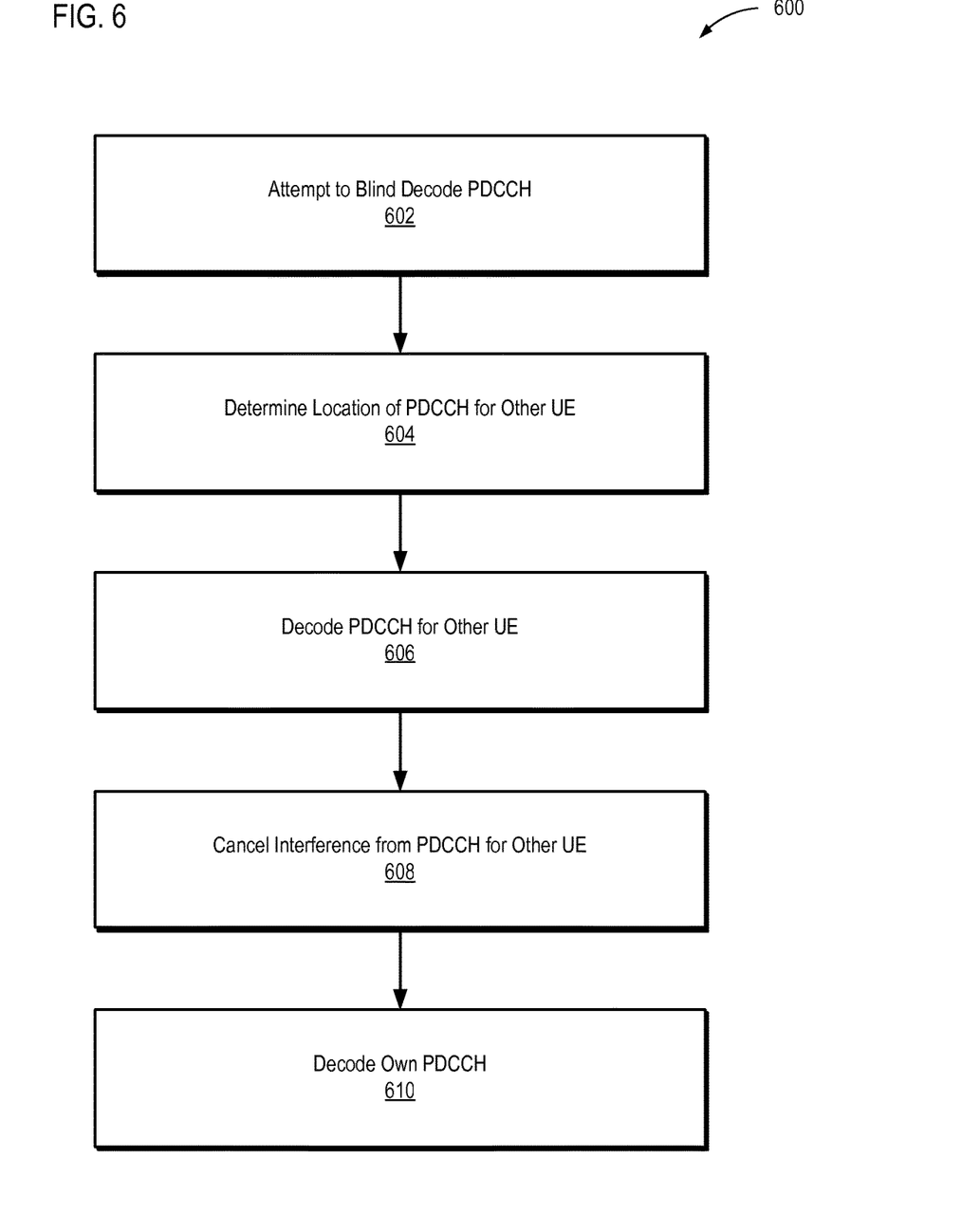
FIG. 6 is a flow diagram of a method for decoding super-position coded control information.

FIG. 6 is a flow diagram of a method 600 for decoding super-position coded control information. The method 600 may begin when a signal containing control information is received from an eNB. Initially, a UE, for example, may attempt 602 to blind decode basic PDCCH. The UE may decode basic PDCCH in each of a plurality of locations to determine whether the PDCCH is intended for the UE. In an embodiment, there may be a maximum of 44 locations where the UE needs to search for basic PDCCH. If the UE finds PDCCH intended for it, the method 600 may end.

If the UE does not find PDCCH intended for it, it may instead attempt to locate extra PDCCH intended for the UE. Alternatively, or in addition, the UE may search for extra PDCCH even if it finds basic PDCCH. The UE may determine 604 the location of PDCCH intended for another UE. Because, in some embodiments, the possible locations for the extra PDCCH may be limited based on a starting position (e.g., a starting CCE index) of the basic PDCCH, the UE may conserve resources by knowing the locations of the PDCCHs intended for other UEs. In an embodiment, the UE may determine 604 the location and/or length of the PDCCH for other UEs by remembering information about the PDCCH acquired when the UE was attempting 602 to decode its own basic PDCCH. In other embodiments, the UE may not need to determine the location of the PDCCH for other UEs and/or may do so while decoding 606 the PDCCH for other UEs.

The UE may decode 606 the basic PDCCH for the other UEs. In an embodiment, the UE may decode the basic PDCCH in every possible location so that it can check for extra PDCCH in every possible location. The UE may decode the basic PDCCH for the other UEs by demodulating the basic PDCCH for the other UEs as it would demodulate basic PDCCH for itself. The UE may simply determine the symbols when demodulating and/or may perform error correction (e.g., using a turbo decoder).

The UE may cancel 608 the decoded PDCCH for the other UEs from the signal. The UE may modulate the decoded PDCCH and may apply the estimated channel response to the modulated PDCCH. The UE may modulate the previously demodulated symbols and/or may modulate the corrected code words. The UE may subtract the results of the modulation and channel estimation from the signal to produce a signal including the extra PDCCH without interference from the basic PDCCH.

The UE may decode 610 extra PDCCH intended for it. The UE may demodulate the signal with the basic PDCCH canceled. The UE may be able to demodulate the signal normally once the basic PDCCH has been canceled. The UE may perform decoding at every possible location where the extra PDCCH could be located. In some embodiments, the extra PDCCH may be required to be in a certain location relative to the basic PDCCH, so the UE may have a limited number of locations that it needs to search for the extra PDCCH. If the UE detects extra PDCCH in any of the locations checked, it may determine whether that extra PDCCH is intended for it. If the extra PDCCH is intended for the UE, the control information may be processed by the UE and the method 600 may end. It will be apparent that various changes to the method 600 may be made, such as removing elements, combining elements, and/or iterating one or more elements of the method 600.

Figure 7:
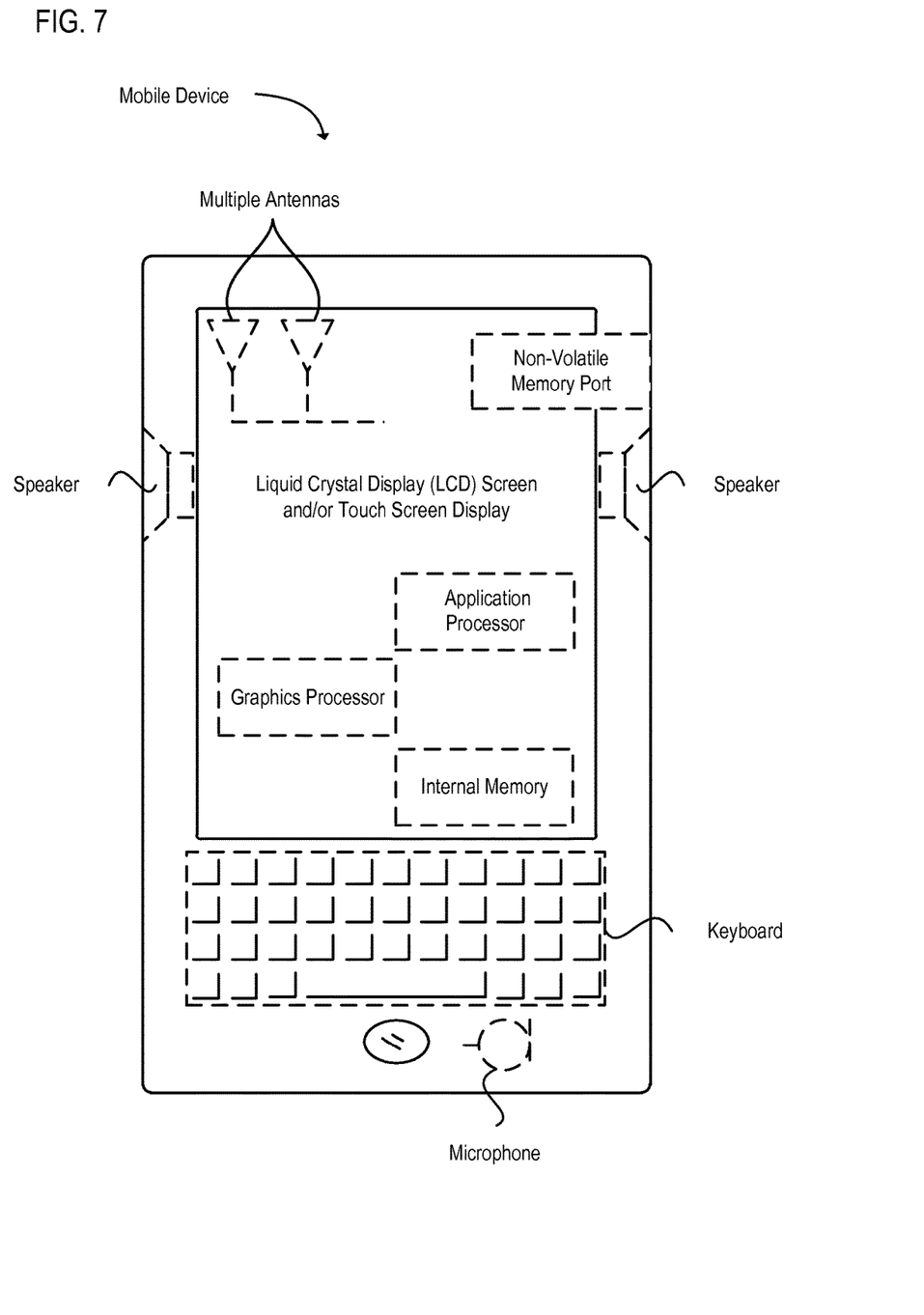
FIG. 7 is a schematic diagram of a UE able to decode super-position coded control information.

FIG. 7 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an eUTRAN. The UE includes a transceiver. The UE includes a transceiver. The UE also includes a processor coupled to the transceiver. The processor is configured to receive a signal via the transceiver. The signal includes a first PDCCH and a second PDCCH. The first and second PDCCH occupy a same frequency-time resource. The processor is also configured to decode the second PDCCH. The processor is also configured to perform interference cancellation on the signal using the decoded second PDCCH. The processor is also configured to decode the first PDCCH.

In Example 2, the processor of Example 1 performs symbol-level interference cancellation on the signal.

In Example 3, the processor of any of Examples 1-2 attempts to decode the signal according to a legacy procedure before the processor decodes the second PDCCH.

In Example 4, the second PDCCH of any of Examples 1-3 has an aggregation level equal to or twice as large as an aggregation level of the first PDCCH.

In Example 5, the first PDCCH of any of Examples 1-4 has an aggregation level higher than would be used for a similar standalone PDCCH.

In Example 6, the processor of any of Examples 1-5 is further configured to initially receive an RRC message indicating that the signal includes the second PDCCH.

In Example 7, the first PDCCH of any of Examples 1-6 is from a first eNB and the second PDCCH is from a second eNB.

In Example 8, the first PDCCH of any of Examples 1-7 has a starting position selected relative to the second PDCCH in a resource map. The starting position is selected from the group consisting of a zero position and a midpoint of the second PDCCH.

Example 9 is a method for decoding super-position coded control information. The method includes blind decoding, using a communication device, a wireless transmission to determine whether relevant control information is present. The method also includes cancelling, using the communication device, control information intended for another communication device in the wireless transmission. The method also includes decoding, using the communication device, control information intended for the communication device from the wireless transmission.

In Example 10, the cancelling control information of Example 9 includes initially demodulating the control information intended for the other communication device.

In Example 11, the cancelling control information of any of Examples 9-10 includes cancelling modulation of the control information from the wireless transmission.

In Example 12, the control information intended for the other communication device of any of Examples 9-11 has a size larger than or equal to a size of the control information intended for the communication device.

In Example 13, the control information intended for the communication device of any of Examples 9-12 has a coding rate higher than a legacy coding rate for the control information intended for the communication device.

In Example 14, the method of any of Examples 9-13 also includes initially receiving a message indicating searching for additional coding information should occur.

In Example 15, initially receiving the message of any of Examples 9-14 includes receiving the message via higher layer signaling.

Example 16 is a wireless communication device. The wireless communication device includes circuitry. The circuitry is configured to receive a signal including basic control information and extra control information. The circuitry is also configured to cancel the basic control information from the signal. The circuitry is also configured to decode the extra control information.

In Example 17, the circuitry of Example 16 determines a starting position of the extra control information in a resource map. The starting position of the extra control information is selected from a predetermined set of locations.

In Example 18, the predetermined set of locations of any of Examples 16-17 includes or consists of a starting position for the basic control information and locations differing from the starting position of the basic control information by multiples of $\frac{1}{2}^{\wedge}n$ times the length of the basic control information. The number n is between zero and three inclusive.

In Example 19, the circuitry of any of Examples 16-18 selects the extra control information from a plurality of extra control information blocks including blocks intended for other devices.

In Example 20, the circuitry of any of Examples 16-19 cancels the basic control information by decoding the basic control information.

In Example 21, the signal of any of Examples 16-20 includes a first signal including the basic control information and a second signal including the extra control information. The first signal is received from a first base station, and the second signal is received from a second base station.

In Example 22, for the signal of any of Examples 16-21, a power ratio between a power of the basic control information and a power of the extra control information is a predetermined value.

Example 23 is method for decoding super-position coded control information. The method includes receiving a signal including a first PDCCH and a second PDCCH. The first and second PDCCH occupy a same frequency-time resource. The method also includes decoding the second PDCCH. The method also includes performing interference cancellation on the signal using the decoded second PDCCH. The method also includes decoding the first PDCCH.

In Example 24, performing interference cancellation of Example 23 includes performing symbol-level interference cancellation.

In Example 25, the method of any of Examples 23-24 includes attempting to decode the first PDCCH according to a legacy procedure before decoding the second PDCCH.

In Example 26, the second PDCCH of any of Examples 23-25 has an aggregation level equal to or twice as large as an aggregation level of the first PDCCH.

In Example 27, the first PDCCH of any of Examples 23-26 has an aggregation level higher than would be used for a similar standalone PDCCH.

In Example 28, the method of any of Examples 23-27 includes initially receiving an RRC message indicating that the signal includes the second PDCCH.

In Example 29, the first PDCCH of any of Examples 23-28 is from a first eNB and the second PDCCH is from a second eNB.

In Example 30, the first PDCCH of any of Examples 23-29 has a starting position selected relative to the second PDCCH in a resource map. The starting position is selected from the group consisting of a zero position and a midpoint of the second PDCCH.

In Example 31, the method of any of Examples 23-30 includes selecting the first PDCCH from a plurality of extra PDCCHs including extra PDCCHs intended for other UEs.

In Example 32, for the signal of any of Examples 23-31, a power ratio between a power of the second PDCCH and a power of the first PDCCH is a predetermined value.

In Example 33, decoding the second PDCCH of any of Examples 23-32 includes blind decoding a plurality of possible PDCCH locations.

In Example 34, decoding the first PDCCH of any of Examples 23-33 includes blind decoding at least two of the plurality of possible PDCCH locations after performing interference cancellation.

In Example 35, for the signal of any of Examples 23-34, a quality of the received signal is sufficient to support a level of modulation higher than that used to modulate the second PDCCH.

Example 36 is an apparatus including means to perform a method as described in any preceding example.

Example 37 is machine readable storage including machine-readable instructions, which when executed, implement a method or realize an apparatus as described in any preceding example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

The embodiments have been described specifically in the context of LTE systems for illustrative purposes. Similar embodiments may be implemented in various other wireless communication systems. For example, the wireless communication system may include a control channel and/or control block other than the PDCCH, a transmitter and/or basestation other than an eNB, and/or a receiver and/or communication device other than a UE. Modifications to suit other wireless communication systems will be apparent to those of skill in the art.

Those having skill in the art will appreciate that many changes may be made to the details of the above-described embodiments without departing from the underlying principles of the disclosure. The scope of the present application should, therefore, be determined only by the following claims.

The invention claimed is:

1. User equipment (UE) configured to communicate with an evolved universal terrestrial radio access network (eUTRAN), the UE comprising:
   a transceiver; and
   a processor coupled to the transceiver, the processor configured to:
      receive a signal intended for the UE from an evolved Node B (eNB) in the eUTRAN via the transceiver, the signal comprising a first set of symbols for a first physical downlink control channel (PDCCH) and a second set of symbols for a second PDCCH, wherein the first set of symbols and the second set of symbols are modulated using a same first modulation technique, wherein the first set of symbols occupies a first position on a constellation plot associated with the first modulation technique that uses a same frequency-time resource and the second set of symbols occupies a second position on the constellation plot associated with a second modulation technique that uses the same frequency-time resource, wherein the second modulation technique is different than the first modulation technique, wherein a first starting position of the second set of control symbols differs from a second starting position of the first set of control symbols by multiples of $½^n$ times a length of the first set of control symbols, and wherein n is a number between zero and three inclusive;
      decode the first set of symbols;
      cancel the decoded first set of symbols from the signal to obtain a partially canceled signal; and
      decode the second set of symbols from the partially canceled signal.

2. The UE of claim 1, wherein the processor performs symbol-level interference cancellation on the signal to cancel the decoded first set of symbols from the signal.

3. The UE of claim 1, wherein the processor attempts to decode the signal according to a legacy procedure before the processor decodes the second set of symbols.

4. The UE of claim 1, wherein an aggregation level of the first PDCCH is equal to or twice as large as an aggregation level of the second PDCCH.

5. The UE of claim 1, wherein an aggregation level of the second PDCCH is higher than would be used for a similar standalone PDCCH.

6. The UE of claim 1, wherein the processor is further configured to initially receive a Radio Resource Control (RRC) message indicating that the signal includes the second PDCCH.

7. The UE of claim 1, wherein a starting position in a resource map of the second PDCCH relative to the first PDCCH is selected from the group consisting of a zero position and a midpoint of the first PDCCH.

8. A method for decoding super-position coded control information, the method comprising:
- blind decoding, using a communication device, a wireless transmission from an evolved Node B (eNB) to determine whether relevant control information is present, the wireless transmission comprising first control information intended for another communication device and second control information intended for the communication device, wherein the first control information and the second control information have a same first modulation scheme, wherein the second control information is transmitted such that on a constellation plot a combined modulation of the first control information and the second control information resembles a second modulation scheme, wherein the second modulation scheme is different than the first modulation scheme, wherein a first starting position of the second control information differs from a second starting position of the first control information by multiples of ½^n times a length of the first control information, and wherein n is a number between zero and three inclusive;
- decoding, using the communication device, the first control information intended for the other communication device from the wireless transmission;
- canceling, using the communication device, the decoded first control information intended for the other communication device from the wireless transmission to obtain a partially canceled wireless transmission; and
- decoding, using the communication device, the second control information intended for the communication device from the partially canceled wireless transmission.

9. The method of claim 8, wherein canceling the first control information comprises initially demodulating the first control information intended for the other communication device.

10. The method of claim 8, wherein canceling the first control information comprises canceling modulation of the first control information from the wireless transmission.

11. The method of claim 8, wherein a size of the first control information intended for the other communication device is larger than or equal to a size of the second control information Intended for the communication device.

12. The method of claim 8, wherein a coding rate of the second control information intended for the communication device is higher than a legacy coding rate for control information intended for the communication device.

13. The method of claim 8, further comprising initially receiving a message indicating searching for additional coding information should occur.

14. The method of claim 13, wherein initially receiving the message comprises receiving the message via higher layer signaling.

15. A wireless communication device comprising:
- circuitry configured to:
  - receive a signal intended for the wireless communication device from an evolved Node B (eNB), the signal comprising basic control information and extra control information, wherein the signal comprises a first signal comprising the basic control information and a second signal comprising the extra control information, and wherein the first signal and the second signal have a same first modulation scheme and are transmitted such that on a constellation plot a combined modulation of the first signal and the second signal resembles a second modulation scheme, wherein the second modulation scheme is different from the first modulation scheme;
  - decode the basic control information from the signal;
  - cancel the decoded basic control information from the signal to obtain a partially canceled signal; and
  - decode the extra control information from the partially canceled signal, wherein the circuitry determines a starting position of the extra control information in a resource map, and wherein the starting position of the extra control information is selected from a predetermined set of locations, wherein the predetermined set of locations consists of a starting position for the basic control information and locations differing from the starting position of the basic control information by multiples of ½^n times a length of the basic control information, and wherein n is a number between zero and three inclusive.

16. The device of claim 15, wherein the circuitry selects the extra control information from a plurality of extra control information blocks including blocks intended for other devices.

17. The device of claim 15, wherein a power ratio between a power of the basic control information and a power of the extra control information is a predetermined value.

* * * * *